United States Patent
Österlund et al.

(10) Patent No.: US 12,197,324 B1
(45) Date of Patent: Jan. 14, 2025

(54) THREAD-LOCAL GARBAGE COLLECTION

(71) Applicant: Oracle International Corporation, Redwood Shores, CA (US)

(72) Inventors: Erik Österlund, Vasterhaninge (SE); Stefan Mats Rikard Karlsson, Nacka (SE); John R. Rose, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/363,655

(22) Filed: Aug. 1, 2023

(51) Int. Cl.
*G06F 12/02* (2006.01)

(52) U.S. Cl.
CPC .................. *G06F 12/0253* (2013.01)

(58) Field of Classification Search
CPC ............. G06F 12/02; G06F 12/0253
USPC .......................................... 711/170
See application file for complete search history.

(56) References Cited

U.S. PATENT DOCUMENTS

| | | |
|---|---|---|
| 5,765,007 A | 6/1998 | Rahman et al. |
| 5,787,430 A | 7/1998 | Doeringer et al. |
| 5,842,016 A | 11/1998 | Toutonghi et al. |
| 5,873,104 A | 2/1999 | Tremblay et al. |
| 5,928,357 A | 7/1999 | Underwood et al. |
| 5,933,840 A | 8/1999 | Menon et al. |
| 6,052,699 A | 4/2000 | Huelsbergen et al. |
| 6,065,020 A | 5/2000 | Dussud |
| 6,158,024 A | 12/2000 | Mandal |
| 6,226,653 B1 | 5/2001 | Alpern et al. |
| 6,304,949 B1 | 10/2001 | Houlsdworth |
| 6,324,637 B1 | 11/2001 | Hamilton |

(Continued)

FOREIGN PATENT DOCUMENTS

| | | |
|---|---|---|
| CA | 2700217 C | 7/2011 |
| JP | 4265610 B2 | 5/2009 |

(Continued)

OTHER PUBLICATIONS

Clifford et al., "Memento Mori: Dynamic Allocation-Site-Based Optimizations", ACM SIGPLAN Notices, vol. 50, No. 11, Jun. 14, 2015, pp. 105-117.

(Continued)

*Primary Examiner* — Than Nguyen
(74) *Attorney, Agent, or Firm* — Invoke

(57) ABSTRACT

Techniques are described herein for performing thread-local garbage collection. The techniques include automatic profiling and separation of private and shared objects, allowing for efficient reclamation of memory local to threads. In some embodiments, threads are assigned speculatively-private heaps within memory. Unless there is a prior indication that an allocation site yields shared objects, then a garbage collection system may assume and operate as if such allocations are private until proven otherwise. Object allocations in a private heap may violate the speculative state of the heap when reachable outside of the thread. When violations to the speculative state are detected, an indication may be generated to notify the garbage collection system, which may prevent thread-local memory reclamation operations until the speculative state is restored. The garbage collection system may learn from the violations to reduce the allocation of invalidly private objects and increase the efficiency of the garbage collection system.

20 Claims, 7 Drawing Sheets

(56) References Cited

U.S. PATENT DOCUMENTS

| | | | |
|---|---|---|---|
| 6,499,032 B1 | 12/2002 | Tikkanen et al. | |
| 6,567,905 B2 | 5/2003 | Otis | |
| 6,694,346 B1 * | 2/2004 | Aman | G06F 9/44563 |
| | | | 718/1 |
| 6,728,732 B1 | 4/2004 | Eatherton et al. | |
| 6,766,513 B2 | 7/2004 | Charnell et al. | |
| 6,769,004 B2 | 7/2004 | Barrett | |
| 6,809,792 B1 | 10/2004 | Tehranchi et al. | |
| 6,915,296 B2 | 7/2005 | Parson | |
| 7,072,905 B2 | 7/2006 | Garthwaite | |
| 7,089,272 B1 | 8/2006 | Garthwaite et al. | |
| 7,269,705 B1 | 9/2007 | Seidl et al. | |
| 7,293,051 B1 | 11/2007 | Printezis et al. | |
| 7,389,395 B1 | 6/2008 | Garthwaite et al. | |
| 7,404,182 B1 | 7/2008 | Garthwaite et al. | |
| 7,523,081 B1 | 4/2009 | Engebretsen | |
| 7,539,837 B1 | 5/2009 | Flood et al. | |
| 7,546,587 B2 | 6/2009 | Marr et al. | |
| 7,548,940 B2 | 6/2009 | Bacon et al. | |
| 7,774,389 B2 | 8/2010 | Stephens et al. | |
| 7,808,929 B2 | 10/2010 | Wong et al. | |
| 7,904,493 B2 | 3/2011 | Schmelter et al. | |
| 7,962,707 B2 | 6/2011 | Kaakani et al. | |
| 8,051,426 B2 | 11/2011 | Meijer et al. | |
| 8,261,269 B2 | 9/2012 | Garmark | |
| 8,495,093 B2 | 7/2013 | Baudel | |
| 8,688,754 B1 | 4/2014 | Burka et al. | |
| 8,788,778 B1 | 7/2014 | Boyle | |
| 8,825,719 B2 | 9/2014 | Steensgaard et al. | |
| 8,825,721 B2 | 9/2014 | Hunt et al. | |
| 8,856,186 B1 | 10/2014 | Li et al. | |
| 9,135,169 B2 | 9/2015 | Kawachiya et al. | |
| 9,208,081 B1 | 12/2015 | Dice et al. | |
| 9,323,608 B2 | 4/2016 | Troia | |
| 9,503,435 B2 | 11/2016 | Mizrahi et al. | |
| 9,727,456 B2 | 8/2017 | Malwankar et al. | |
| 9,740,716 B2 | 8/2017 | Wilhelmsson | |
| 9,971,683 B1 | 5/2018 | Bell et al. | |
| 10,002,074 B2 | 6/2018 | Flood et al. | |
| 10,261,898 B1 | 4/2019 | Payer | |
| 10,664,391 B2 | 5/2020 | Jang | |
| 10,795,812 B1 | 10/2020 | Duggal et al. | |
| 10,929,288 B1 | 2/2021 | Moore et al. | |
| 10,983,908 B1 | 4/2021 | Zou et al. | |
| 10,996,884 B2 | 5/2021 | Danilov et al. | |
| 11,366,801 B1 | 6/2022 | Kumar et al. | |
| 11,507,503 B1 | 11/2022 | Sterlund et al. | |
| 11,573,894 B2 | 2/2023 | Österlund et al. | |
| 2002/0059520 A1 | 5/2002 | Murakami et al. | |
| 2003/0005027 A1 * | 1/2003 | Borman | G06F 9/445 |
| | | | 718/104 |
| 2003/0188141 A1 * | 10/2003 | Chaudhry | G06F 9/3851 |
| | | | 712/E9.05 |
| 2004/0186863 A1 | 9/2004 | Garthwaite | |
| 2004/0187102 A1 | 9/2004 | Garthwaite | |
| 2005/0066329 A1 | 3/2005 | Fischer et al. | |
| 2005/0081190 A1 | 4/2005 | Betancourt et al. | |
| 2005/0102670 A1 | 5/2005 | Bretl et al. | |
| 2005/0114844 A1 | 5/2005 | Betancourt et al. | |
| 2005/0149686 A1 | 7/2005 | Bacon et al. | |
| 2005/0160416 A1 | 7/2005 | Jamison | |
| 2005/0188164 A1 * | 8/2005 | Ballantyne | G06F 9/5016 |
| | | | 711/170 |
| 2005/0235006 A1 | 10/2005 | Adl-Tabatabai et al. | |
| 2005/0267996 A1 | 12/2005 | O'Connor et al. | |
| 2006/0005171 A1 | 1/2006 | Ellison | |
| 2006/0026379 A1 | 2/2006 | Jung | |
| 2006/0143168 A1 | 6/2006 | Rossmann | |
| 2006/0143395 A1 | 6/2006 | Zohar et al. | |
| 2007/0016633 A1 | 1/2007 | Lindholm et al. | |
| 2007/0022149 A1 | 1/2007 | Bacon et al. | |
| 2007/0162528 A1 | 7/2007 | Wright et al. | |
| 2007/0234005 A1 | 10/2007 | Erlingsson et al. | |
| 2008/0034175 A1 | 2/2008 | Traister et al. | |
| 2008/0086619 A1 | 4/2008 | Traister et al. | |
| 2008/0140737 A1 | 6/2008 | Garst et al. | |
| 2008/0162787 A1 | 7/2008 | Tomlin et al. | |
| 2009/0007075 A1 | 1/2009 | Edmark et al. | |
| 2009/0037660 A1 | 2/2009 | Fairhurst | |
| 2009/0119352 A1 | 5/2009 | Branda et al. | |
| 2009/0132622 A1 | 5/2009 | Rossmann et al. | |
| 2009/0158288 A1 | 6/2009 | Fulton et al. | |
| 2009/0307292 A1 | 12/2009 | Li et al. | |
| 2009/0319720 A1 | 12/2009 | Stefanus et al. | |
| 2009/0328007 A1 | 12/2009 | Chen et al. | |
| 2010/0011357 A1 | 1/2010 | Ramamurthy | |
| 2010/0082710 A1 | 4/2010 | Kilner et al. | |
| 2010/0114998 A1 | 5/2010 | Steensgaard et al. | |
| 2010/0254254 A1 | 10/2010 | Chan et al. | |
| 2010/0287350 A1 | 11/2010 | Ylonen | |
| 2011/0145637 A1 | 6/2011 | Gray et al. | |
| 2011/0208792 A1 | 8/2011 | Printezis et al. | |
| 2011/0246543 A1 | 10/2011 | Gracie et al. | |
| 2011/0286420 A1 | 11/2011 | Cho et al. | |
| 2012/0203804 A1 | 8/2012 | Burka et al. | |
| 2013/0054925 A1 * | 2/2013 | Hsia | G06F 11/3604 |
| | | | 711/170 |
| 2013/0073821 A1 | 3/2013 | Flynn et al. | |
| 2013/0138703 A1 * | 5/2013 | Daynes | G06F 9/44521 |
| | | | 707/813 |
| 2013/0227236 A1 | 8/2013 | Flynn et al. | |
| 2013/0290648 A1 | 10/2013 | Shao et al. | |
| 2013/0318132 A1 | 11/2013 | Basu et al. | |
| 2013/0332909 A1 | 12/2013 | Odaira et al. | |
| 2014/0032922 A1 | 1/2014 | Spilman | |
| 2014/0033213 A1 * | 1/2014 | Hudson | G06F 12/0253 |
| | | | 718/102 |
| 2014/0101372 A1 | 4/2014 | Jung et al. | |
| 2014/0108817 A1 | 4/2014 | Chen et al. | |
| 2014/0195818 A1 | 7/2014 | Neumann et al. | |
| 2014/0278447 A1 | 9/2014 | Unoki et al. | |
| 2014/0310235 A1 | 10/2014 | Chan et al. | |
| 2014/0359201 A1 | 12/2014 | Chakrabarti | |
| 2015/0006843 A1 | 1/2015 | Moser | |
| 2015/0026167 A1 | 1/2015 | Neels et al. | |
| 2015/0058381 A1 | 2/2015 | Wilhelmsson | |
| 2015/0081996 A1 | 3/2015 | Flood | |
| 2015/0100752 A1 | 4/2015 | Flood | |
| 2015/0227416 A1 | 8/2015 | Reinart | |
| 2015/0365941 A1 | 12/2015 | Liu et al. | |
| 2015/0378870 A1 | 12/2015 | Marron et al. | |
| 2016/0012280 A1 | 1/2016 | Ito et al. | |
| 2016/0042015 A1 | 2/2016 | Landau et al. | |
| 2016/0124802 A1 | 5/2016 | Gabor et al. | |
| 2016/0163381 A1 | 6/2016 | Lee | |
| 2016/0170649 A1 | 6/2016 | Ramesh et al. | |
| 2016/0179580 A1 | 6/2016 | Benedict | |
| 2016/0239413 A1 | 8/2016 | Stephens et al. | |
| 2016/0283369 A1 | 9/2016 | Hada | |
| 2016/0350214 A1 | 12/2016 | Payer et al. | |
| 2017/0006135 A1 | 1/2017 | Siebel et al. | |
| 2017/0039242 A1 | 2/2017 | Milton et al. | |
| 2017/0177168 A1 | 6/2017 | Abudib et al. | |
| 2017/0177471 A1 | 6/2017 | Frazier et al. | |
| 2017/0262364 A1 | 9/2017 | Liden et al. | |
| 2017/0344473 A1 | 11/2017 | Gidra et al. | |
| 2018/0074854 A1 | 3/2018 | Chan | |
| 2018/0173728 A1 | 6/2018 | Munakata | |
| 2018/0276120 A1 * | 9/2018 | Vytiniotis | G06F 12/145 |
| 2018/0335968 A1 | 11/2018 | Pauley et al. | |
| 2018/0365106 A1 | 12/2018 | Huang et al. | |
| 2019/0042406 A1 | 2/2019 | Guniguntala et al. | |
| 2019/0042440 A1 | 2/2019 | Kumar et al. | |
| 2020/0012600 A1 | 1/2020 | Konoth et al. | |
| 2020/0012647 A1 | 1/2020 | Johnson et al. | |
| 2020/0026781 A1 | 1/2020 | Khot et al. | |
| 2020/0081748 A1 | 3/2020 | Johnson et al. | |
| 2020/0125364 A1 | 4/2020 | Osterlund | |
| 2020/0202127 A1 | 6/2020 | Chen et al. | |
| 2020/0250084 A1 | 8/2020 | Stephens et al. | |
| 2020/0310963 A1 | 10/2020 | Nilsen | |
| 2020/0327052 A1 | 10/2020 | Nilsen | |
| 2020/0379902 A1 | 12/2020 | Durham et al. | |
| 2021/0124608 A1 | 4/2021 | Shveidel et al. | |

(56) References Cited

U.S. PATENT DOCUMENTS

| | | |
|---|---|---|
| 2021/0278990 A1 | 9/2021 | Choi |
| 2022/0058732 A1 | 2/2022 | Reses |
| 2022/0138098 A1 | 5/2022 | Osterlund et al. |
| 2022/0188432 A1 | 6/2022 | Turmel et al. |

FOREIGN PATENT DOCUMENTS

| | | |
|---|---|---|
| WO | 00/29937 A2 | 5/2000 |
| WO | 2016/073019 A1 | 5/2016 |
| WO | 2017/053754 A1 | 3/2017 |
| WO | 2017/178114 A9 | 12/2017 |

OTHER PUBLICATIONS

Title: Reconsidering custom memory allocation; author:: Ed Berger et al., published on 2002.
Title: Understanding memory allocation of Scheme programs author: M Serrano published on 2000.
Vechev et al. "Write Barrier Elision for Concurrent Garbage Collectors", 2004 (Year: 2004).
Verma A., "The comprehensive guide to react's virtual DOM", May 15, 2021, pp. 23.
Wilson, P.R., et al., "A "Card-making" scheme for controlling intergenerational differences in generation-based garbage collection on stock hardware," ACM SIGPLAN Notices, vol. 24, Issue 5, May 1989, pp. 87-92.
Write Barrier Elision for Concurrent Garbage Collectors by Vechev (Year: 2004).
Yang et al., "Deep Dive into ZGC: A Modern Garbage Collector in OpenJDK", ACM Transactions on Programming Language and Systems, ACM, New York, NY, 2022, vol. 44, No. 4, 34 Pages.
Yang et al., "Improving Program Locality in the GC using Hotness," PLDI' 20, pp. 301-313, Jun. 15-20, 2020.
Yuasa et al., "Return Barrier," International Lisp Conference, 2002, 12 pages.
Yuasa, T., "Real-time garbage collection on general-purpose machines," Journal of Systems and Software, vol. 11, Issue 3, <arch 1990, pp. 181-198.
ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.
Zhao et al., "Low-latency, high-throughput garbage collection", PLDI 2022: Proceedings of the 43rd ACM SIGPLAN International Conference on Programming Language Design and Implementation, Jun. 2022, pp. 76-91.
"Basic Graph Algorithms", Indian Computing Olympiad, Retrieved from https://www.iarcs.org.in/inoi/online-study-material/topics/graphs-dfs.php, Retrieved on Dec. 8, 2022, pp. 3.
"Lazy Compaction", Retrieved from https://wiki.se.oracle.com/display/JPG/Lazy+Compaction, Retrieved on Sep. 20, 2022, 2 Pages.
"React as UI runtime", Overreacted, Feb. 2, 2019, pp. 38.
"Recitation 8—Dijkstra's Algorithm and DFS Numberings", Parallel and Sequential Data Structures and Algorithms, 15-210 (Fall 2013), Oct. 16, 2013, pp. 1-6.
"What is Schema?" Retrieved from https://github.com/json-schema-org/understanding-json-schema, Jan. 11, 2023, pp. 3.
"ZGC—Generations Revision 2," accessed at https://wiki.se.oracle.com/display/JPG/ZGC+-+Generations+Revision , Feb. 1, 2020, pp. 6.
A concurrent, generational garbage collector for a multithreaded implementation of ML by Doligez (Year: 1993).
A Hardware Accelerator for Tracing Garbage Collection by Maas (Year: 2018).
Armbrust Michael Michael@Databricks com et al, "Spark SQL Relational Data Processing in Spark," Proceedings of The 2015 ACM SIGMOD International Conference on Management of Data, SIGMOD '15, ACM Press, New York, New York, USA, May 27, 2015, pp. 1383-1394.
Benjamin Zorn, Barrier Methods for Garbage Collection, Nov. 1990, UC Boulder available at: https://spl.cde.state.co.us/artemis/ucbserials/ucb51110internet/1990/ucb51110494internet.pdf(Year: 1990).
Boehm et al.; "Efficient In-Memory Indexing with Generalized Prefix Trees", downloaded from https://pdfs.semanticscholar.org/c5ca/a359fe6b345580a4dd476d5dd41a90bf301c.pdf; Mar. 26, 2018.
Click et al.; "The Pauseless GC Algorithm", VEE 05, Jun. 11-12, 2005, Chicago, Illinois, USA. Copyright 2005 ACM 1-59593-047-7/05/0006 . . . S5.00.
David Gnedt, "Fast Profiling in the HotSpot Java VM with Incremental Stack Tracing and Partial Safepoints," Faculty of Engineering and Natural Sciences, 2014, 57 pages.
Detlefs; "Concurrent Remembered Set Refinement in Generational Garbage Collection", Proceedings of the USENIX Java VM '02 Conference, Aug. 1-2, 2002, San Francisco, CA.
Domani et al., "Implementing an On-the-fly Garbage Collector for Java," ACM SIGPLAN Notices, vol. 36, No. 1, 2000, pp. 155-166.
Dorai et al., Control delimiters and their hierarchies, LISP and Symbolic Computation: An International Journal, vol. 3, 1990, pp. 67-99.
Ellis D., "What is Swagger? A beginner's guide", Jul. 26, 2022, pp. 6.
Feng et al.; "Trie-join: a trie-based method for efficient string similarity joins", Published online Oct. 4, 2011; The VLDB Journal Springer-Verlag 2011.
Fitzgerald; "The Case for Profile Directed Selection of Garbage Collectors", Proceedings of the 2nd International Symposium on Memory Management, ACM, New York, NY USA, 111-120, DOI= 10.1145/362422.362472, http://doi.acm.org/10.1145/362422.362472.
Generational Garbage Collection, Write Barriers/Write Protection and userfaultfd(2) by Cracauer (Year: 2016).
Getting started with Z Garbage Collector(ZGC) in Java 11 [Tutorial] by Davis (Year: 2019).
Goetz, Java theory and practice Garbage collection in the HotSpot JVM, Generational and concurrent garbage collection, IBM Developer Works, Nov. 25, 2003.
Harris T, et al., "Dynamic filtering: multi-purpose architecture support for language runtime systems," ACM SIGARCH Computer Architecture News, vol. 38, Issue 1, Mar. 2010, pp. 39-52.
Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.
Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.
How to Implement Java's hashCode Correctly, May 19, 2016, Available online at <https://www.sitepoint.com/how-to-implement-javas-hashcode-correctly/>, 7 pages.
JDK 15, Available online at < https://openjdk.java.net/projects/jdk/15/ >, Last updated, Sep. 15, 2020, 2 pages.
JEP 333: ZGC: A Scalable Low-Latency Garbage Collector(Experimental) by Liden and Karlsson (Year: 2020).
Joisha; "Sticky Tries: Fast Insertions, Fast Lookups, No Deletions for Large Key Universe", ISMM '14, Jun. 12, 2014, Edinburgh UK.
Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.
Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.
M. Felleisen et al., Beyond Continuations: Technical Report No. 216, Feb. 1987, 13 pages.
Main—Main—OpenJDK Wiki, Created by Iris Clark, last modified by Per Liden, available online at <URL: https://wiki.openjdk.java.net/display/zgc/Main>, Oct. 15, 2020, 9 pages.

(56) References Cited

OTHER PUBLICATIONS

Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv:1212.5094 [cs.LO].

Mostly Concurrent Garbage Collection Revisited by Barabash (Year: 2003).

Olsson et al.; "Trash a dynamic LC-trie and hash data structure", Trita-CSC-TCS 2006:2, ISRN/KTH/CSC/TCS-2006/2-SE, ISSN 1653-7092, Aug. 18, 2006.

Open JDK, "HotSpot Glossary of Terms", 2006, Sun Microsystems, available at <https://openjdk.java.net/groups/hotspot/docs/HotSpotGlossary.html>, 6 pages.

Osterlund E., "Garbage Collection supporting automatic JIT parallelization in JVM", Computer Science, Jun. 26, 2012, pp. 29.

Osterlund E., "Going Beyond On-The-Fly Garbage Collection and Improving Self-Adaptation with Enhanced Interfaces", Computer Science, 2019, pp. 68.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Robbin Ehn, "JEP 312: Thread-Local Handshakes," Hotspot Dash Dev at Openjdk Dot Java Dot Net, available at <http://openjdk.java.net/jeps/312>, 2018, 3 pages.

Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.

Ryan Sciampacone et al., "Garbage collection in WebSphere Application Server V8, Part 2: Balanced garbage collection as a new option", IBM developerWorks, Aug. 3, 2011.

Saxena et al., "Key and Value Paired Data using Java Hash Table," International Journal of Engineering and Management Research, vol. 4, Issue 1, Feb. 2014, pp. 81-89.

Stefan Karlsson, JEP 439: Generational ZGC, Aug. 25, 2021, OpenJDK, available at: https://openjdk.org/jeps/439 (Year: 2021).

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

The Z Garbage Collector—Low Latency GC OpenJDK, available online at <http://cr.openjdk.java.net/~pliden/slides/ZGC-Jfokus-2018.pdf>, 2018, 96 pages.

Title: Detecting and eliminating memory leaks using cyclic memory allocation, author: JJ Nguyen et al., published on 2007.

\* cited by examiner

THREAD-LOCAL GARBAGE COLLECTION

TECHNICAL FIELD

The present disclosure relates to garbage collection optimizations in runtime environments with automated memory management. In particular, the present disclosure relates to techniques for reclaiming memory local to a thread.

BACKGROUND

Memory allocation is the process of assigning and managing memory space within a computing system. Generally, an allocator process divides available system memory into specific blocks and assigns the blocks to different parts of a program. Memory allocation is often thought of as inexpensive in terms of the time and computational resources required to perform the allocation operations. However, allocations typically come at an amortized cost of performing garbage collection to free up contiguous chunks of memory that can be used by allocators for subsequent memory allocations. Garbage collection may be relatively expensive by comparison, especially when the process includes tracing through live objects to prove the memory is able to be reclaimed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
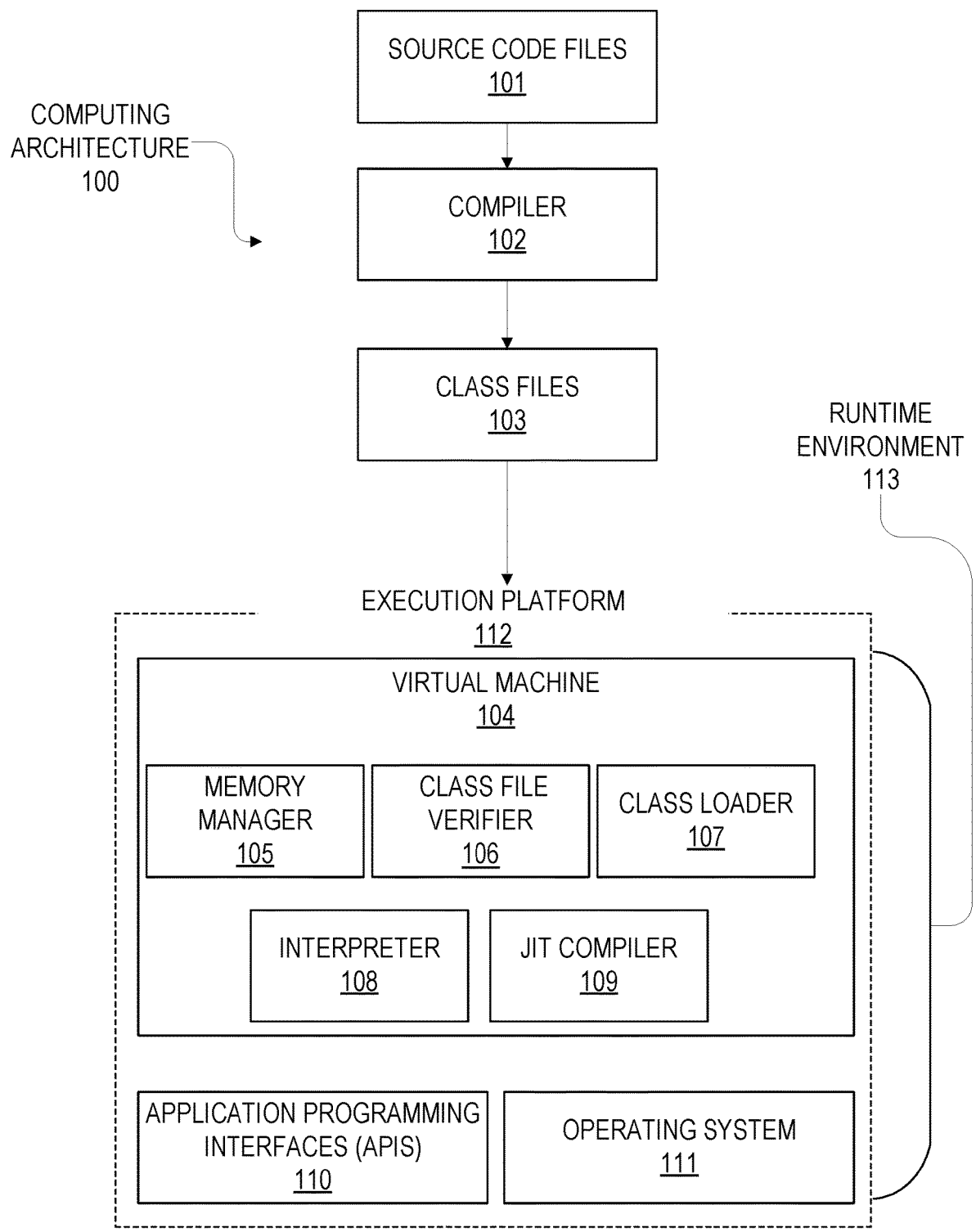
FIG. 1 illustrates an example computing architecture in which techniques described herein may be practiced in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for performing thread-local garbage collection. Embodiments herein include automatic profiling and separation of private and shared objects, allowing for accelerated reclamation of memory local to a thread. The automatic profiling and separation techniques may include providing threads with a speculatively private heap within memory. Unless there is a prior indication that an allocation site yields shared objects, then a garbage collection system may assume and operate in a speculative state as if such allocations are private until proven otherwise. Object allocations may violate the speculative state of the heap when objects in the private heap are reachable outside of the associated thread, such as from global roots or another thread.

In some embodiments, the assumption that a thread's heap is private is invalidated when a pointer is written into memory from a location outside the speculatively private heap to the private heap. In such a scenario, the speculation that objects in the private heap are only reachable from the thread itself is violated. The garbage collection system may recover from violations through a relocation and marking process to restore integrity to the private heap.

In some embodiments, the garbage collection system learns over time based on detected violations where to set boundaries between private and shared objects within thread-local memory. When violations are detected, the system may check if there is an allocation site context associated with the allocated object. If so, then the allocation site context may be added to a record of provably shared allocation sites, which may be used to compile new code that treats the object as shared in future memory management operations. With automated boundary learning, the number of violations during program runtime may trend toward zero, thereby improving and eventually stabilizing garbage collection performance.

A pointer, as used herein, refers to a datum which denotes the identity of some target object A and is said to point to its target object. A single object may be pointed to by many occurrences of the same pointer. In some embodiments, a pointer to a target object is the address of the first memory word associated with the target object within the heap containing the object. In other embodiments, pointers may be represented as indexes or offsets rather than addresses, or as addresses of other structures in memory, such as handles, that associate with the target object. A source object B is said to point to a target object A when a memory location associated with the source object B stores a pointer to the target object A. The pointer to a target object A may be loaded from a source object B and stored into a third object C. In this configuration, both B and C are source objects pointing in common to the target object A. Besides being stored in an object within a heap, a pointer may be stored in a thread or in a per-class area. A pointer may be said to point to a heap when it points to some target object contained in the heap. Similarly, if an object or a thread or a per-class area contains a pointer that points to some object (or heap), then that object or thread or per-class area points to the object or heap by virtue of the pointer it contains. One or more embodiments described in this Specification and/or recited in the claims may not be included in this General Overview section.

2. Runtime Environments

In some embodiments, the techniques described herein for managing and perform thread-local memory reclamation operations are executed within a runtime environment. A runtime environment in this context may include supporting code, tools and/or other hardware/software components that implement a program's execution. One or more components of the runtime environment may vary depending on the programming language of the program's source code, the hardware platform on which the program is executed, the operating system version, and/or other system attributes.

FIG. 1 illustrates an example computing architecture in which techniques described herein may be practiced. Software and/or hardware components described with relation to the example architecture may be omitted or associated with a different set of functionality than described herein. Software and/or hardware components, not described herein, may be used within an environment in accordance with some embodiments. Accordingly, the example environment should not be constructed as limiting the scope of any of the claims.

As illustrated in FIG. 1, computing architecture 100 includes source code files 101 which are compiled by compiler 102 into blueprints representing the program to be executed. Examples of the blueprints include class files 103, which may be loaded and executed by execution platform 112. Execution platform 112 includes runtime environment 113, operating system 111, and one or more application programming interfaces (APIs) 110 that enable communication between runtime environment 113 and operating system 111. Runtime environment 113 includes virtual machine 104 comprising various components, such as memory manager 105 (which may include a garbage collector), class file verifier 106 to check the validity of class files 103, class loader 107 to locate and build in-memory representations of classes, interpreter 108 for executing virtual machine code, and just-in-time (JIT) compiler 109 for producing optimized machine-level code.

In some embodiments, computing architecture 100 includes source code files 101 that contain code written in a particular programming language, such as Java, C, C++, C#, Ruby, Perl, and so forth. Thus, source code files 101 adhere to a particular set of syntactic and/or semantic rules for the associated language. For example, code written in Java adheres to the Java Language Specification. However, since specifications are updated and revised over time, source code files 101 may be associated with a version number indicating the revision of the specification to which source code files 101 adhere. One or more of source code files 101 may be written in a programming language supported by automatic garbage collection.

In various embodiments, compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 104 that is capable of running on top of a variety of particular machine environments. The virtual machine instructions are executable by virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which virtual machine 104 resides.

In some embodiments, virtual machine 104 includes interpreter 108 and a JIT compiler 109 (or a component implementing aspects of both), and executes programs using a combination of interpreted and compiled techniques. For example, virtual machine 104 may initially begin by interpreting the virtual machine instructions representing the program via the interpreter 108 while tracking statistics related to program behavior, such as how often different sections or blocks of code are executed by virtual machine 104. Once a block of code surpass a threshold (is "hot"), virtual machine 104 may invoke JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, runtime environment 113 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

Source code files 101 have been illustrated as the "top level" representation of the program to be executed by execution platform 111. Although computing architecture 100 depicts source code files 101 as a "top level" program representation, in other embodiments source code files 101 may be an intermediate representation received via a "higher level" compiler that processed code files in a different language into the language of source code files 101.

In some embodiments, compiler 102 receives as input the source code files 101 and converts the source code files 101 into class files 103 that are in a format expected by virtual machine 104. For example, in the context of the JVM, the Java Virtual Machine Specification defines a particular class file format to which class files 103 are expected to adhere. In some embodiments, class files 103 contain the virtual machine instructions that have been converted from source code files 101. However, in other embodiments, class files 103 may contain other structures as well, such as tables identifying constant values and/or metadata related to various structures (classes, fields, methods, and so forth).

Figure 2:
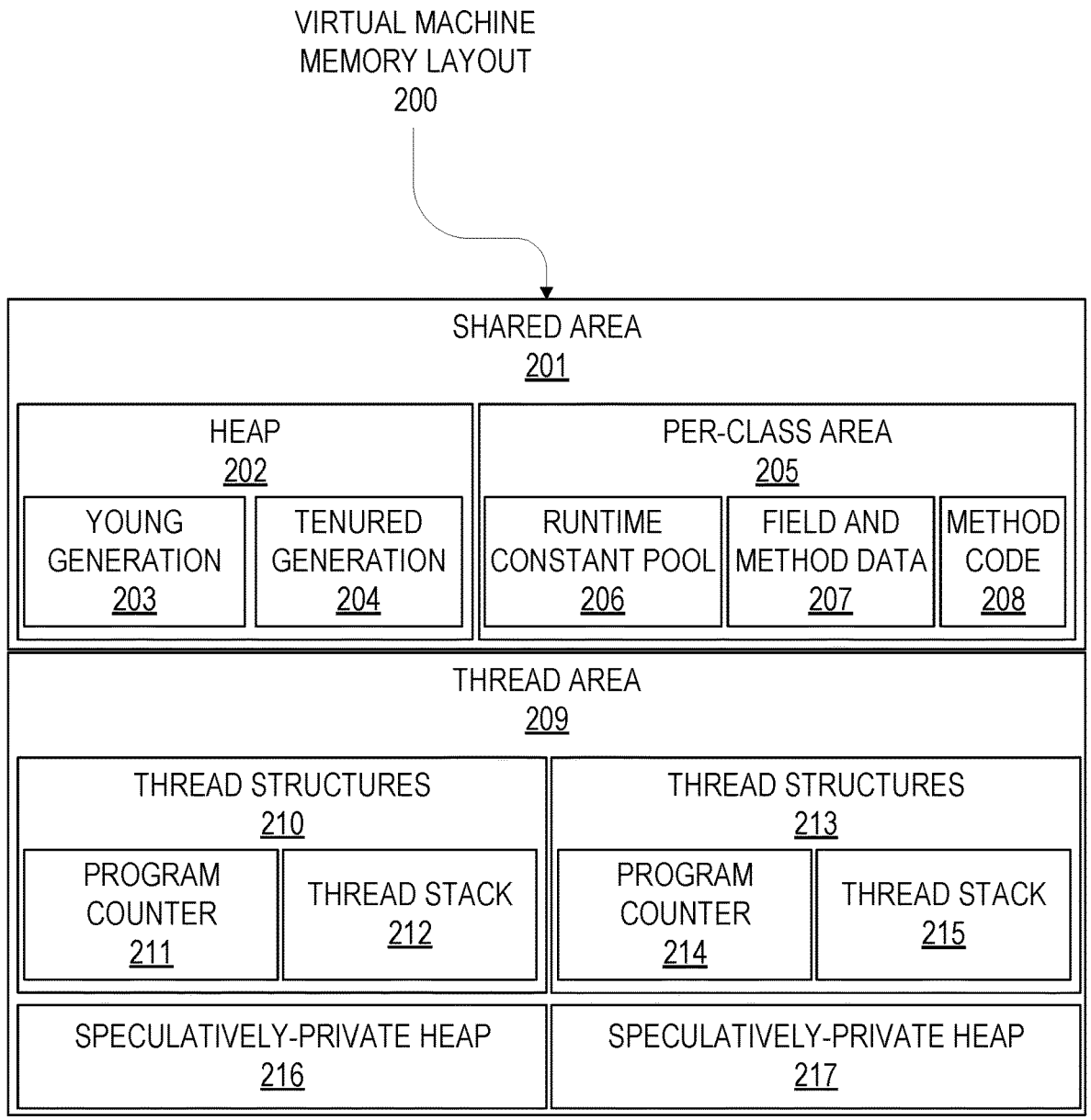
FIG. 2 illustrates an example virtual machine memory layout according to some embodiments.

FIG. 2 illustrates example virtual machine memory layout 200 according to some embodiments. Virtual machine 104 may adhere to the virtual machine memory layout 200 depicted in FIG. 2. In other embodiments, the memory layout of virtual machine 104 may vary, such as by including additional components and/or omitting one or more of the depicted components, depending on the runtime environment. Although components of the virtual machine memory layout 200 may be referred to as memory "areas", there is no requirement that the memory areas are physically contiguous.

In the example illustrated by FIG. 2, virtual machine memory layout 200 is divided into shared area 201 and thread area 209. Shared area 201 represents an area in memory where structures shared among the various threads executing on virtual machine 104 are stored. Shared area 201 includes heap 202 and per-class area 205.

Heap 202 represents an area of memory allocated on behalf of a program during execution of the program. In some embodiments, heap 202 includes young generation 203 and tenured generation 204. Young generation 203 may correspond to regions of the heap that stores newly created objects during program execution. When young generation 203 is filled, the oldest objects are promoted to tenured generation 204 to free up space for new objects in young generation 203. Promoting an object may comprise moving to a different region and/or reclassifying the data objects.

Separate treatment of different generations of objects may facilitate generational garbage collection. Objects may often have a short lifecycle during program execution. Thus, performing garbage collection more frequently on objects stored in young generation 203 may optimize the amount of space that may be reclaimed for a given scan. Although only two generations are depicted, in other embodiments, heap 202 may include other age-related generations, such as a permanent generation.

In some embodiments, young generation 203 is not subject to any GC barriers. Stated another way, the garbage collector does not restrict objects within this region of memory from being mutated. In contrast, GC barriers may be applied to tenured generation 204 to maintain the position of pointers within the data objects. In addition or as an alternative to young generation 203 and tenured generation 204, heap 202 may organize data objects into other memory areas in a manner that is not age-based. For example, data objects may be stored in different regions based on datatype, size, and/or other object attributes. Some regions that are not age-based may be subject to GC barriers while other regions may not be subject to GC barriers. Thus, the in-memory organization of data objects may vary depending on the implementation. Further, the techniques described herein are applicable to runtime environments that perform generational garbage collection and runtime environments that perform non-generational garbage collection. Examples include mark-and-sweep, reference counting, incremental, concurrent, and region-based garbage collection.

Per-class area 205 represents the memory area where the data pertaining to the individual classes are stored. In some embodiments, per-class area 205 includes, for each loaded class, run-time constant pool 206 representing data from a constant table of the class, field and method data 207 (for example, to hold the static fields of the class), and the method code 208 representing the virtual machine instructions for methods of the class.

Thread area 209 represents a memory area where structures specific to individual threads are stored. In FIG. 2, thread area 209 includes thread structures 210 and thread structures 213, representing the per-thread structures utilized by different threads. In order to provide clear examples, thread area 209 depicted in FIG. 2 assumes two threads are executing on the virtual machine 104. However, in a practical environment, virtual machine 104 may execute any arbitrary number of threads, with the number of thread structures scaled accordingly. A thread may be physical or virtual in nature. Physical threads are typically tightly coupled to an operating system kernel, where a thread includes a sequence of instructions that may be executed independently by a hardware processor. Virtual threads are created and managed by a runtime library or framework within the user-space of an application and do not rely on kernel-level threads managed by the operating system. Thus, the creation scheduling, and switching of virtual threads may be handled by the application or virtual machine itself without involving the operating system's thread scheduler.

In some embodiments, thread structures 210 includes program counter 211 and thread stack 212. Similarly, thread structures 213 includes program counter 214 and thread stack 215.

In some embodiments, program counter 211 and program counter 214 store the current address of the virtual machine instruction being executed by their respective threads. Thus, as a thread steps through the instructions, the program counters are updated to maintain an index to the current instruction.

In some embodiments, thread stack 212 and thread stack 215 each store stack frames for their respective threads, where each stack frame holds local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, virtual machine 104 generates a new frame and pushes the frame onto the virtual machine stack associated with the thread.

When a method invocation completes, virtual machine 104 passes back the result of the method invocation to the previous frame and pops the current frame off of the stack. In some embodiments, for a given thread, one frame is active at any point. This active frame is referred to as the current frame, the method that caused generation of the current frame is referred to as the current method, and the class to which the current method belongs is referred to as the current class.

Thread stack 212 and thread stack 215 may correspond to native operating system stacks or virtual thread stacks. Generally, the number of virtual threads executing on a machine is much greater than the number of native threads. Continuations may also be used to reify the program control state, where a continuation captures the state of a thread at a particular point in its execution including the values of its registers, program counter, and stack. When a thread is scheduled by the operating system or a thread scheduler, its current state, including the continuation, may be serialized, allowing the thread to be suspended and later resumed such that the thread may continue executing without losing its progress.

In some embodiments, thread area 209 includes speculatively-private heap 216 and speculatively-private heap 217. A speculatively private heap is assigned to a particular thread and is used for object allocations that are speculated to be private to the heap. An allocated object is private to the thread if it is not reachable by other threads or global roots. The number of private heaps that are created may vary depending on the number of threads that are alive within the runtime environment at a given moment. Heaps may be assigned to individual virtual threads or individual kernel-based threads.

Figure 3:
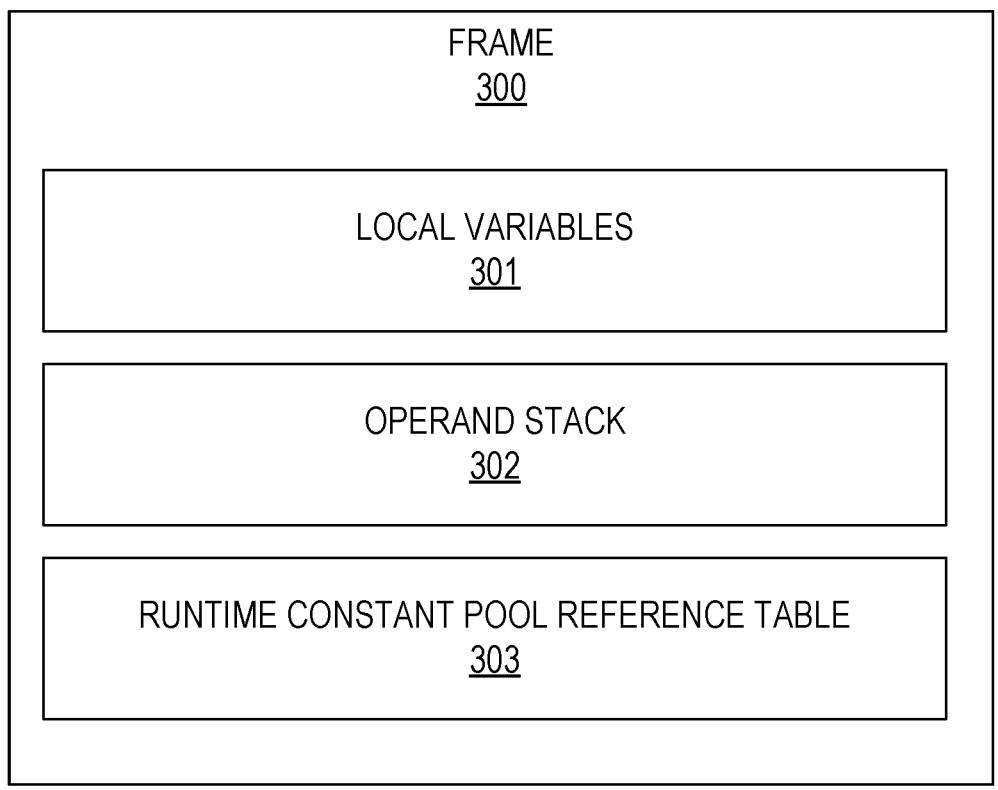
FIG. 3 illustrates an example frame layout according to some embodiments.

FIG. 3 illustrates an example frame layout according to some embodiments. In some embodiments, frames of a thread stack, such as thread stack 212 and thread stack 215 adhere to the structure of frame 300.

In some embodiments, frame 300 includes local variables 301, operand stack 302, and run-time constant pool reference table 303. In some embodiments, local variables 301 are represented as an array of variables that each hold a value, for example, Boolean, byte, char, short, int, float, or reference. Further, some value types, such as longs or doubles, may be represented by more than one entry in the array. The local variables 301 are used to pass parameters on method invocations and store partial results. For example, when generating the frame 300 in response to invoking a method, the parameters may be stored in predefined positions within the local variables 301, such as indexes 1-N corresponding to the first to Nth parameters in the invocation. The parameters may include pointers and other references.

In some embodiments, operand stack 302 is empty by default when frame 300 is created by virtual machine 104. Virtual machine 104 then supplies instructions from method code 208 of the current method to load constants or values from local variables 301 onto operand stack 302. Other instructions take operands from operand stack 302, operate on them, and push the result back onto operand stack 302. Furthermore, operand stack 302 is used to prepare parameters to be passed to methods and to receive method results. For example, the parameters of the method being invoked could be pushed onto the operand stack 302 prior to issuing the invocation to the method. Virtual machine 104 then generates a new frame for the method invocation where the operands on operand stack 302 of the previous frame are popped and loaded into local variables 301 of the new frame. When the invoked method terminates, the new frame is popped from the virtual machine stack and the return value is pushed onto operand stack 302 of the previous frame.

In some embodiments, run-time constant pool reference table 303 contains a reference to the run-time constant pool of the current class (e.g., runtime constant pool 206). Run-time constant pool reference table 303 is used to support resolution. Resolution is the process whereby symbolic references in the constant pool are translated into concrete memory addresses, loading classes to resolve as-yet-undefined symbols and translating variable accesses into appropriate offsets into storage structures associated with the run-time location of these variables.

3. Private Heap Speculation Profiling

Within a runtime environment, many objects allocated by a particular thread may never become reachable from other threads. Objects that are not reachable from other threads are referred to herein as "private" objects. A thread to which a speculatively private heap is provided may include physical threads of execution and/or virtual threads. If a heap assigned to the thread includes only private objects, then a garbage collection process may reclaim the private memory with very little overhead when a thread terminates. In particular, the memory may be reclaimed without having to perform expensive tracing operations to identify references to objects on the program stack to live objects since none of the private objects will remain live for a thread.

A heap assigned to a thread may initially be "speculatively" private as the system may not be able to efficiently determine whether an object allocated by a thread will be shared. An object stored in a private heap associated with a particular thread may be called a private-heap object associated with that same particular thread. A pointer to a private object is also called a private-heap pointer. A pointer to a target object in a private heap that does not originate from a source object in the same private heap or from a thread associated with the same private heap, such as another thread or a global root, is referred to herein as an invading pointer. The effect of an invading pointer is to make an object in a private heap fail to be private. In the absence of invading pointers, all objects in a private heap associated with a particular thread are in fact private to that thread. But an invading pointer can make one or more objects no longer private, even though it is stored in a private heap. Conversely, objects in non-private heaps may be either private or shared, depending on the details of how the objects are reachable Some objects, such as class objects, are shared since the objects are reachable from global roots. A global root, in the context of garbage collection, refers to a variable or data structure that is a starting point for identifying reachable objects during the garbage collection process. The variable or data structure may serve as a root of an object graph that the garbage collector traverses to determine which objects are still in use and which can be reclaimed. Global roots typically include variables or data structures that are accessible from any part of the program and are known to contain references to objects.

Embodiments herein include a system of speculations and checks to the effect that pointers to target objects in a private heap are not invading pointers. When there are no invading pointers, all objects in a private heap are in fact private and, when the thread exits, the entire private heap may be discarded without further processing. On the other hand, a pointer which targets a private object, if stored into a global root variable, creates an invading pointer which causes the speculation to fail.

Another potential cause of a speculation failure is when a pointer into a private heap is written into an object outside of the same private heap, which also creates an invading pointer from a source object in a different heap. Once an invading pointer to a target object is stored in the wrong source object or in a global root, it may then be loaded into an unrelated thread (distinct from the thread associated with the object in the private heap). At that point it may be difficult to control access to the target object, even though it is in a heap that is intended for the private use of a particular thread. In these scenarios, an object stored within the speculatively private heap for a target thread may still be reachable by another thread even after the target thread terminates. As a result, memory allocated for the object may not be safely reclaimed.

In some environments, the runtime environment dynamically detects violations the moment before speculation fails. When violations are detected, the runtime environment switches to an operating mode that does not assume the speculatively private heaps are private. One approach is to treat only private heaps that are sources of the violation as being compromised. However, another thread could read the offending reference and store a pointer to the object from its own private heap. This scenario may occur in a private-to-private store, which may cause additional violations if the store is not between the same private heaps. Detecting that the private heaps are the same is computationally expensive. Another approach to avoid such overhead is to operate as if all private heaps are potentially mixed with shared and private objects until proven otherwise.

Figure 4:
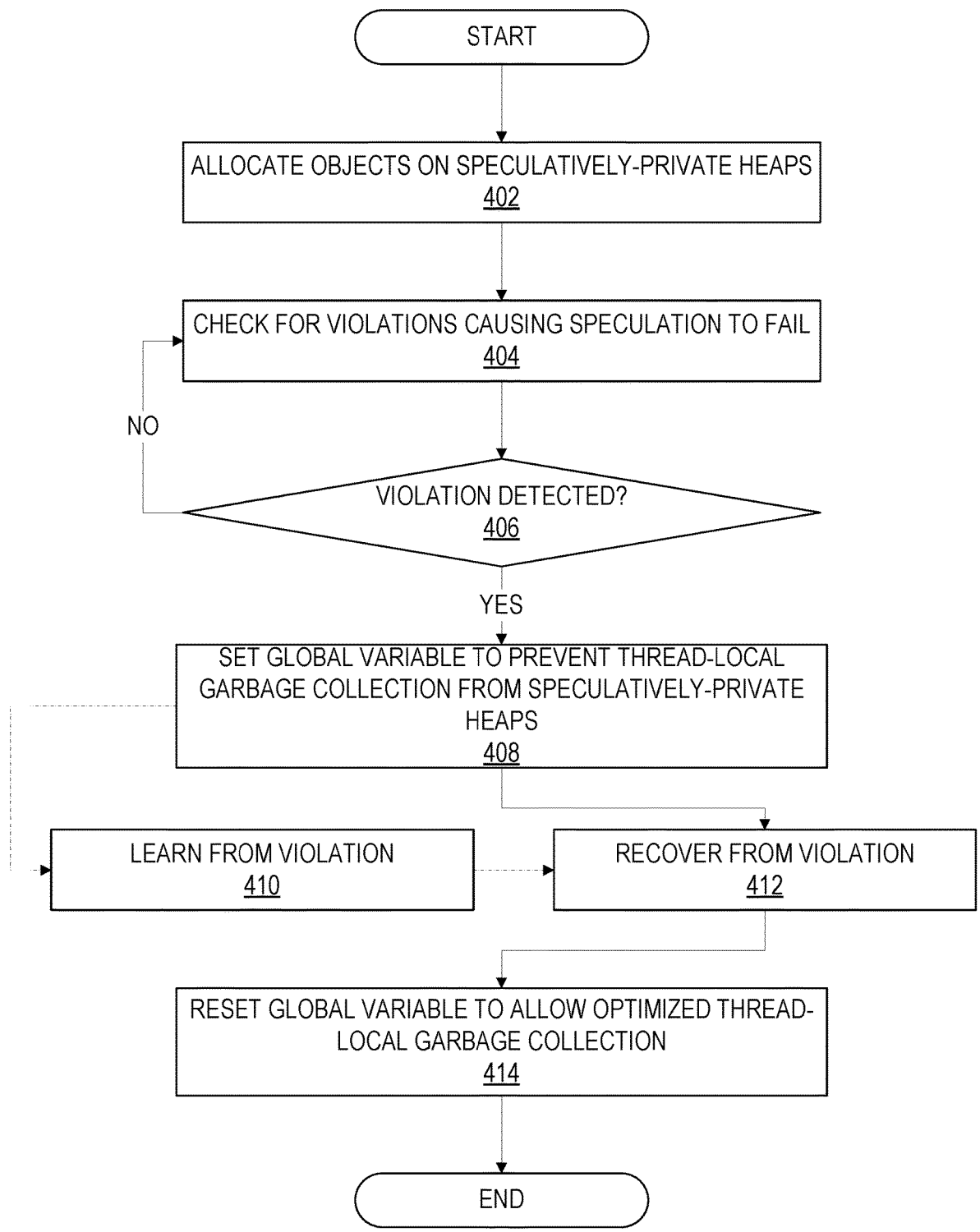
FIG. 4 illustrates an example set of operations for managing accelerated thread-local garbage collection operations in accordance with some embodiments.

FIG. 4 illustrates an example set of operations for managing accelerated thread-local garbage collection operations in accordance with some embodiments. One or more operations illustrated in the figures herein may be modified, rearranged, or omitted all together. Accordingly, the particular sequence of operations illustrated in FIG. 4 and the other flowcharts herein should not be construed as limiting the scope of one or more embodiments.

Referring to FIG. 4, an allocator process allocates objects on speculatively-private heaps (operation 402). Specifically, the allocator process may reserve, within a program's runtime environment, one or more blocks of memory within the private heap to accommodate an object for a thread. Object are allocated by a particular thread on the private heap assigned to the thread. The size of the memory block(s) may be determined based on the object's data structure and object metadata, the latter of which may be added by the runtime environment. Once memory is reserved, the allocator process may initialize the object to set the object in its initial state. For example, the allocator process may initialize instance variables by setting default values and/or invoke constructors/initialization methods. The allocator process may generate an identifier or reference to refer to the newly allocated object. The program may access and manipulate the object using the object identifier.

In some embodiments, the runtime environment checks for violations causing speculation to fail (operation 404). As previously noted, speculation that a heap is private may fail if an invading pointer is created. The runtime environment may dynamically catch such violations the moment before speculation fails.

To detect violations, the runtime environment may determine if an object is private or shared. The mechanism for detecting if an object is private or shared may vary depending on the particular implementation. In some embodiments, an allocator denotes a specific bit in the address of an object allocation to signify private. That is, if the bit is set in the address, then the object is private. This scheme may use a multi-mapped memory, where multiple threads share objects by mapping the same physical memory region into their virtual address spaces. In other cases, the scheme may use hardware-based address masking, or uncommit shared memory when allocating private memory. In these cases, no multi-mapped memory is used. However, the allocator may use address encoding schemas to determine if an object is private or not.

To detect cases when a pointer targeting private objects are stored in global roots, the allocator may check if the private bit is set in the target. The target in this context refers to the new value being stored into the field allocated on the heap. If the bit is set (e.g., the bit has a value of 1 although a 0 may alternatively be used as the set value), then a violation is detected.

With respect to heap reference stores, the allocator may execute an and-not instruction between the base object of the field and the new reference (the target). The private bit of a pointer is set if it is a private allocated object and not set otherwise. The result of the and not between different types of sources and destinations of edges stored into an object graph is illustrated in the table below:

| Results of And-Not Instructions for Different Types of Sources and Destinations | | |
|---|---|---|
| | Shared (Base/Source) | Private (Base/Source) |
| Shared (Target/Destination) | 0 | 0 |
| Private (Target/Destination) | 1 | 0 |
| Null | 0 | 0 |

As illustrated in the table, the private bit is set if and only if a shared-to-private store is performed. In the context of an object graph, a source of an edge refers to the object from which the edge originates and corresponds to the object that holds the reference or pointer to another object, establishing the connection. The destination of an edge refers to the object being pointed to or referenced by the edge. The destination object represents an endpoint or target of the relationship. The and-not instruction flips the denoted bit of the source (the not operations) and applies an and operation with the bit of the destination. If the result of the and-not instruction is a 1, then a violation is detected. The and-not instruction may act as a write barrier that operates on the private bits in the object addresses.

Referring again to FIG. 4, the process determines whether a violation is detected (operation 406). For example, the process may detect whether a pointer is an invading pointer by applying the write barrier mentioned above. If a violation is not detected, then the speculation may be maintained as consistent. In the speculative state (also referred to herein as a consistent state), a garbage collector may perform accelerated reclamation of private heaps that are local to threads as discussed further herein. A global flag may be maintained to indicate whether the system is currently operating in a consistent or inconsistent state.

In the event that a violation is detected, then a global variable is set to prevent optimized reclamation of memory from the speculatively-private heaps (operation 408). Optimized reclamation of memory in this context refers to the thread-local garbage collection techniques described herein, which may be performed without performing expensive stack trace operations. As previously noted, once an invading pointer is detected, then the validity of all speculatively-private heaps is compromised. Thus, a global variable, such as a flag, may serve to notify the garbage collector that speculation has failed and disable thread-local garbage collection.

In some embodiments, the runtime environment learns from violations (operation 410). A learning process may identify allocation contexts associated with violations and serialize this data. When future allocations are detected for allocation sites matching the allocation context, the allocator may perform an object allocation on a shared heap rather than a private heap. The learning process may reduce the number of violations over time until a stable state has been reached. Techniques for learning are described further below in Section 5, titled Learning from Mistakes.

Once a violation to the integrity of a private heap is detected, optimized thread-local garbage collection may not be performed until faith has been restored with respect to the integrity of the private heaps. Thus, responsive to detecting that the global flag has been set and the system is operating in an inconsistent state, the system initiates a process to recover from the violation (operation 412). Recovery operations are described in further detail below in Section 6, titled, Recovery from Violations.

Once the recovery operation is complete, the flag is reset to place the system in a consistent state, thereby enabling optimized thread-local garbage collection (operation 414). The process may continue executing during program runtime to detect violations, learn boundaries between private and shared objects, and optimize garbage collection operations to reclaim memory.

In some cases, profiling and learning may not be able to stabilize system performance in an optimized way. For example, it may be that code is dynamically changing at a frequent rate that causes the boundaries between shared and private objects to constantly shift. It is anticipated that such scenarios will be rare. However, the runtime environment may include a mechanism to stop profiling and thread-local operations if the system does not stabilize within a threshold amount of time.

4. Thread-Local Garbage Collection Triggers

Thread-local garbage collection may be optimized by triggering the memory reclamation process for the thread when the private heap has as few live objects as possible. In a transactional workload, such as a server serving requests, this trigger point may be determined by finding where the request loop is.

One method for finding where the request loop is involves profiling frames for where a request loop is called. For example, the system may inspect stack watermark barriers to detect the frame from which a thread never returns. A stack watermark is used to track the state of a stack scan and allows the system to distinguish whether a given frame is above the watermark (assuming stack grow downward). A stack watermark barrier may inject a hook such that returning back into the request loop frame results in a callback in the virtual machine where a thread-local garbage collection may be triggered. In other words, a return barrier may be attached such that garbage collection is triggered at return from the request loop.

Another method for detecting when to trigger thread-local garbage collections is to profile thread deaths. A thread may be allocated at an allocation site which is recorded. For example, the record may store bytecode indices a few frames up in the stack from where the request loop is. When a thread exits, the system may profile the performance of a thread-local garbage collection to determine if the performance satisfied a threshold. With virtual threads, it may be anticipated that the server loop allocates a new virtual thread for each request to be handled. With this logic, the system may trigger garbage collection precisely where the body of the server loop ends. In other words, garbage collection may be triggered at thread exit.

The example methods above trigger garbage collection using an automated detection mechanism to find trigger points at thread exit or return to a caller. However, another approach is for users to explicitly define the trigger points within program code. For example, a user may add a routine within the source code that launches thread-local garbage collection at a particular trigger point.

Figure 5:
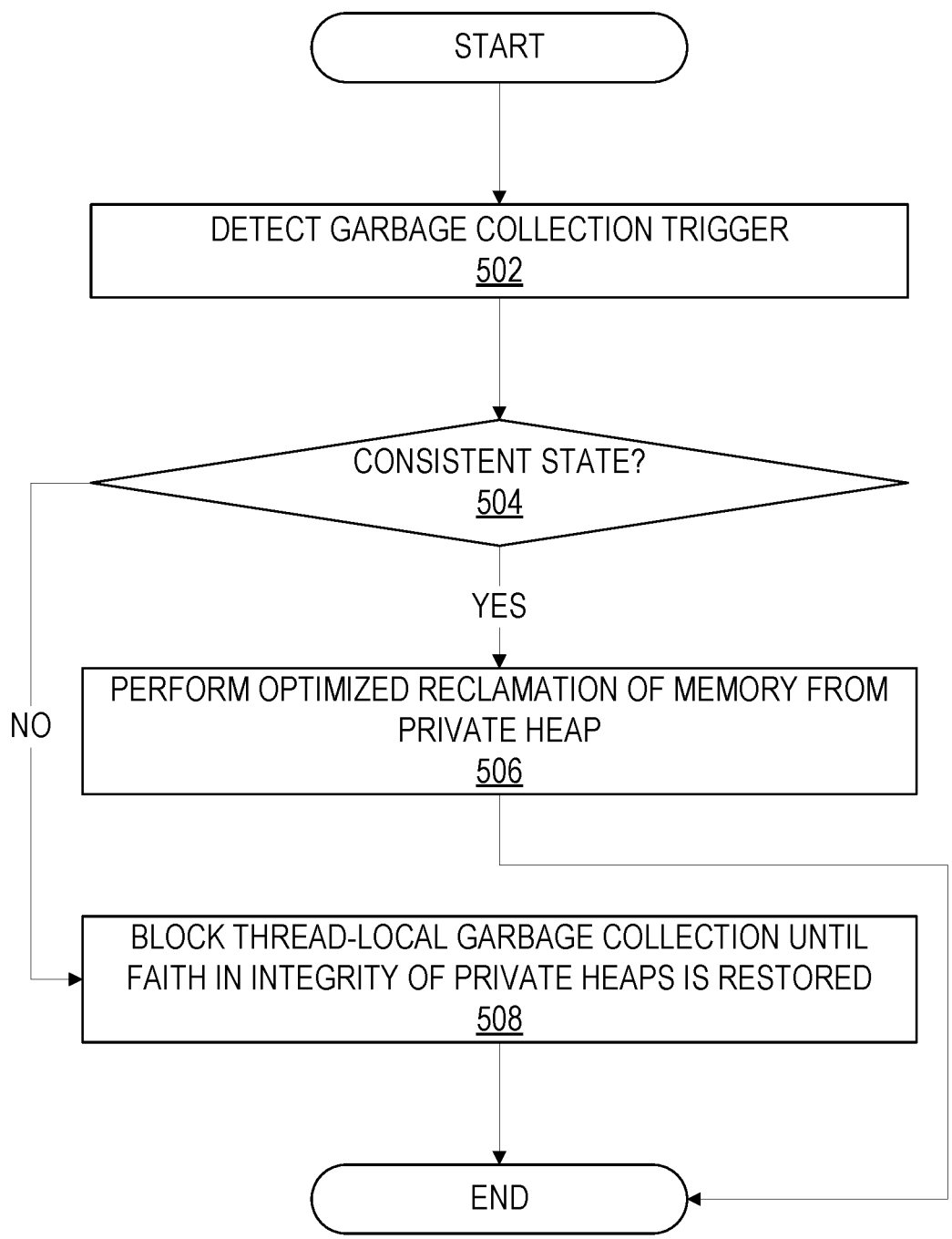
FIG. 5 illustrates an example set of operations for performing garbage collection in accordance with some embodiments.

FIG. 5 illustrates an example set of operations for performing garbage collection in accordance with some embodiments. During program runtime, the system detects a garbage collection trigger (operation 502). For example, the trigger may be detected when a thread exits or returns to a calling function, which may be automatically detected as previously discussed. In other cases, the trigger point may be explicitly called out within program code.

Responsive to detecting the trigger, the garbage collector determines whether the system is currently operating in a consistent state (operation 504). In some embodiments, the garbage collector checks the global variable/flag to determine whether or not it is set. A set flag indicates to the garbage collector that a violation was detected, which presents a risk that a shared object may be stored in a private heap for a thread. Stated another way, when in the consistent state, objects on the speculatively-private heaps have not been exposed outside the local context, and the associated object graphs are truly private.

If the flag is not set, then the garbage collector performs an optimized reclamation of memory from the heap (operation 506). In the consistent state, the system may operate with the guarantee that objects in the heap for the thread that terminated are private. Thus, the memory may be reclaimed near-instantaneously with almost no cost. When a thread-local garbage collection is triggered, in some embodiments, the thread may be configured to trace through all live private objects reachable from the thread moving the objects out of the private heap. In cases of virtual threads, however, the thread's attempt to perform a trace will be instant (a no operation, also referred to as a no-op) because the operation is performed when the thread just exited. As a result, the thread trace is not able to reach any objects at all if the state is consistent. In other embodiments, the garbage collection process may infer that a trace is not required when in the consistent state and reclaim the memory the moment a thread-local garbage collection is triggered.

The manner in which memory is reclaimed may vary depending on how the heap is organized. For example, if an allocator operates on contiguous memory of a particular size, then a relationship arises with respect to what granularity of reclamation is performed to satisfy allocations. In some cases, reclamation may use free lists of linked contiguous chunks to reclaim memory. That is, when a memory block is deallocated or freed, the reclamation process may add it back to the free list signifying that the memory block has been marked as free and is available for future allocations. In other cases, a private heap may be structured as a single contiguous chunk, which may be freed without the use of free lists. However, the heap may be organized according to other schemes, and the exact reclamation process may vary from implementation to implementation. Once the reclaimed, memory from a previous object allocation may be used for new object allocations.

If the flag is set, indicating that the system is in an inconsistent state, then thread-local garbage collection is blocked until faith in the integrity of the private heaps is restored (operation 508). Thus, memory is not reclaimed for the thread responsive to the triggering event when in the inconsistent state. Once faith has been restored, then a thread-local garbage collection may subsequently be run to reclaim the memory. Alternatively, memory within the speculatively-private heap may be reclaimed using a conventional, non-optimized garbage collection process, such as using a global generational garbage collector.

5. Learning from Mistakes

When a violation is detected in the system, there exists a pointer to a speculatively-private object that is not private. The system may learn from the mistake such that the next time a similar object is allocated, it will be allocated as a shared object instead. A naive approach is to mark the entire class as shared so that when new instances of the class are allocated, the allocations are not private. However, this approach is coarse-grained and may result in result in moving many private objects to shared storage.

Another more fine-grained approach is sample allocation information and associate the metadata with an allocated object. The metadata may include a small part of the stack trace indicating what method and what byte code index the program is at for a set number of frames up the stack. Additionally or alternatively, the metadata may include other allocation information, such as the program counter stored in the current stack frame and a threshold number of program counters from other contiguous frames on the stack (e.g., the program counter for the caller). With sampling, not all objects may receive the metadata association, but the objects with attached metadata include accurate information about the allocation site context. The sampled allocation information may then be used to learn boundaries between shared and private objects. In particular, the system may learn which allocation sites have caused speculation to fail and prevent these allocation sites (the location in a program's source code or execution where a memory allocation occurs) from causing future failures.

Figure 6:
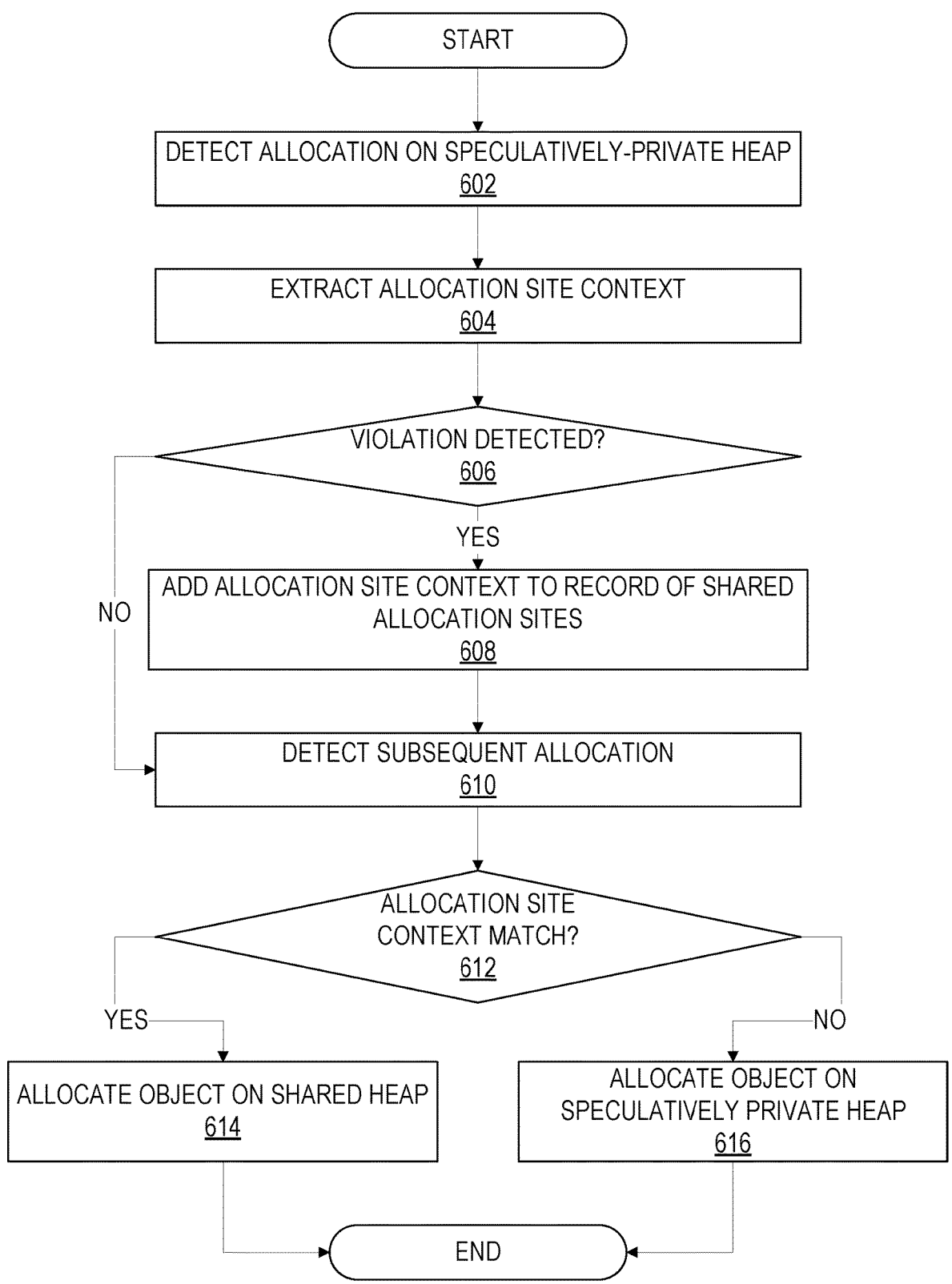
FIG. 6 illustrates an example set of operations for learning boundaries between shared and private objects in accordance with some embodiments.

FIG. 6 illustrates an example set of operations for learning boundaries between shared and private objects in accordance with some embodiments. The system detects an allocation on a speculatively-private heap (operation 602). In some embodiments, the system is configured to detect and sample the information whenever memory is allocated from a slow path in the virtual machine. Allocations from the fast path code are not sampled or may be sampled at a lower frequency. In the context of virtual machines with JIT compilation, the slow path refers to the initial interpretation or profiling phase of the program, where the JIT compiler collects runtime information and generates optimized machine code. This phase is generally slower compared to the fast path, which involves subsequent execution of the optimized, JIT-compiled machine code.

When an allocation is detected, the allocator extracts the allocation site context (operation 604). In some embodiments, the allocator extracts the current byte code index and a small part of the stack trace. For example, the allocator may extract the current frame and up to a threshold number of additional contiguous frames up the stack. Additionally or alternatively, other allocation site context information may be extracted. In some cases, the program counter for the current frame and/or a calling frame may be used to identify violating allocation sites, and the allocation site context information may include a set of one or more program counters rather than the entire stack frame.

During program runtime, the process may determine whether an allocation of the object triggered a violation that caused speculation to fail (operation 606). For example, a violation may be detected based on the results of the and-not instruction as previously described.

If a violation is detected, then the system may check to determine whether there is an associated allocation context attached to the object. For example, the system may check the object metadata for the bytecode index, stack trace portion, and/or set of program counters. As previously noted, not all objects may include the sampled set of information. However, if the object does include the sampled information and triggered a violation, then the allocation site context is added to a record of shared allocation sites (operation 608).

In some embodiments, a record of "provably shared allocation sites" is built as a radix tree from a given allocation bytecode and describes the caller contexts. A radix tree is a compact prefix tree in which nodes with only one child are merged with a parent. The radix tree may store the stack trace portion that identifies the method and the bytecode index for a threshold number of frames on the stack relative to the allocation site. However, other data structures may be used to store the shared allocation site information. Additionally or alternatively, the data structure may store a set of one or more program counters, such as the program counter of the frame that was current with the allocation and the program counter of a caller.

The system further detects a subsequent allocation on a speculatively-private heap (operation 610). The subsequent recovery may occur before or after recovery from the violation.

Upon detecting the subsequent allocation, the system determined whether there is an allocation site context match in the record of shared allocation sites (operation 612). For example, when an interpreter allocates at a particular bytecode, the interpreter may check if there is a root in the corresponding radix tree. If a root is found, then the interpreter may compare if the radix tree and the execution stack match.

In other embodiments, a shadow stack may be maintained, where the shadow stack includes only the byte code index and method of the caller context. In this case, the determination of a match may be based on the shadow stack instead of the full execution stack. That is, the bytecode index and method of the caller context may be compared to the radix tree rather than physically walking the execution stack for this information. Thus, a shadow stack may allow for more efficient comparisons to detect matches.

In other embodiments, a match may be detected based on a comparison of one or more program counters. For example, the program counter of the current frame and caller may be compared to the allocation context information stored in the record of provably shared allocation sites. A match may be detected if the sequence of program counters is stored in the record.

If a match is detected, then the object is allocated on a shared heap (operation 614). Thus, the object will not cause future violations by being stored again within a speculatively-private heap. As the program continues execution, the boundaries that are learned may increase until a stabilization point where most or all of the boundaries have been learned. Once the stabilization rate has been reached, the system operates in a consistent state all or most of the time, allowing for efficient thread-local garbage collection to reclaim memory. Increasing the rate of thread-local garbage collection may also improve efficiency by reducing the allocation rate observed by global generational garbage collectors.

If no match is detected, then the object is not provably shared, and the object is allocated on the speculatively-private heap assigned to the thread (operation 616). In this scenario, the object is assumed to be private until proven otherwise.

With respect to JIT-compiled code, each compilation unit often inlines several methods. Inlining, in the context of JIT compilation, refers to an optimization technique where the JIT compiler replaces a function or method call with the actual body of the called function. In other words, the compiler inserts the function's code directly into the calling context instead of executing the function call overhead. When a function is inlined, the calling code no longer contains a function call instruction reducing the overhead of the call. Inlining of several functions may remove multiple call instructions and collapse multiple logical frames into a single physical frame. Such inlining is referred to as the virtual machine state.

In the context of inlining, when code is emitted for an allocation site, the system may check if the virtual machine state of the allocation site matches an entry in the radix tree of shared allocation sites of the bytecode. If a match is detected, then the allocation may emit code for allocating a shared object instead of a private object. For each allocation that is determined not to be shared, a similar radix tree of virtual machine state may be attached to the allocation bytecode, indicating the assumption that an allocation site is speculated to be private, with a pointer back in the leaf to the compiled method. When an invalidly private object is found, the p 21 system may check the attached data structure for JIT-compiled code for deoptimization. If JIT-compiled code is detected, new code may be compiled that correctly assumes the object is shared. The new code (which may also be JIT-compiled) may then replace the JIT-compiled code and be executed to perform future object allocations.

In some embodiments the learned boundaries may be serialized and persisted by the runtime environment. For example, the serialized data may include the record of allocation site contexts that indicate which allocation sites in the program triggered violations. In the event that an application terminates and is restarted, the application may load the serialized data. The system may then check the record when performing future allocations to determine whether to allocate objects on a shared or private heap.

6. Recovering from Violations

Once a violation to the integrity of the private heap is detected, optimized thread-local garbage collection operations may be disabled until faith in the integrity has been restored. In some embodiments, a recovery process to restore integrity includes (a) relocating speculatively private yet provably not private objects to shared memory and (b) marking through the entire heap without violations.

In some embodiments, the recovery process is performed as part of a global garbage collection process. For example, when the marking of a full garbage collection starts, the system has a snapshot of the reachable object graph in the entire heap. The recovery process may then use a form of Snapshot-At-The-Beginning (SATB) marking where only the very first mutation of a field during the concurrent phase is recorded, and both the field address and the previous value is recorded. During the marking phase of the recovery process, when the snapshot of objects is marked through, the process may then find the snapshot of all violations. The marking process may then note violations every time a speculatively private object is found that is pointed to from a global root, from a non-private heap location, or from a different private heap. If the SATB graph can be entirely traversed without detecting a single violation, then the recovery process may assume that the violation detection barriers previously described would have caught any violation introduced since the marking started. If no such violation was detected by the store barriers, then the recovery process may assume that the system has been purged from violations. Thus, the recovery process may start reclaiming the private heaps.

When violations are detected from the marking process or store barriers, the system may learn from the mistakes as previously described. During a relocation phase, the recovery process relocates the incorrectly assumed private objects to shared heap areas. As a result, a subsequent full garbage collection may declare the system free of violations, and the global variable may be reset to indicate that the system is no longer operating in an inconsistent state.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
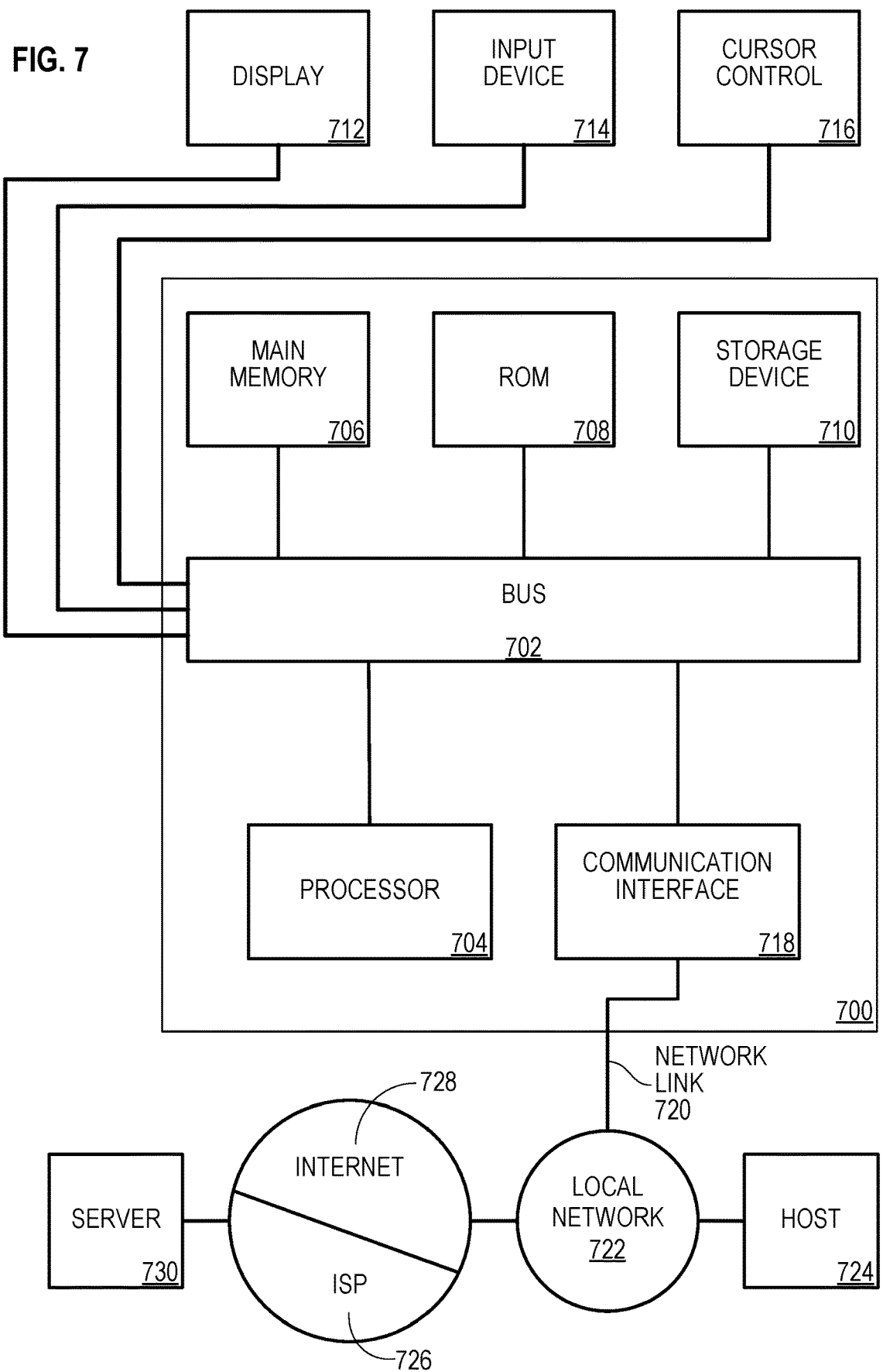
FIG. 7 shows a block diagram that illustrates a computer system in accordance with some embodiments.

For example, FIG. 7 is a block diagram that illustrates computer system 700 upon which some embodiments of the invention may be implemented. Computer system 700 includes bus 702 and/or one or more other communication mechanisms for transferring data between system components. Computer system 700 also includes hardware processor 704 coupled with bus 702 for processing information. Hardware processor 704 may be, for example, a general-purpose microprocessor.

Computer system 700 further includes main memory 706, such as random-access memory (RAM) and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 and/or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light-emitting diode (LED) screen, for displaying information to a computer user. Input device 714, including alphanumeric and other keys, is coupled to bus 702 for communicating information and command selections to processor 704. Another type of user input device is cursor control 716, such as a touchscreen, mouse, a trackball, or cursor direction keys for communicating direction information and command selections to processor 704 and for controlling cursor movement on display 712. This input device may have two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes communication interface 718 coupled to bus 702. Communication interface 718 provides a two-way data communication coupling to network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
performing an object allocation within a private heap associated with a thread;
detecting that the object allocation violates a speculative state where a garbage collection system operates as if objects in private heap are only reachable by the thread;
responsive to detecting that the object allocation violates the speculative state, generating an indication that notifies the garbage collection system that the speculative state is violated;
detecting a trigger for performing a thread-local garbage collection to reclaim memory from at least one private heap;
responsive to detecting the trigger, determining, by the garbage collection system, whether to initiate the thread-local garbage collection based at least in part on the indication.

2. The method of claim 1, wherein detecting that the object allocation violates the speculative state comprises: detecting that a pointer to a target object in the private heap does not originate from a source object in the private heap or from a thread associated with the private heap.

3. The method of claim 1, wherein generating the indication comprises updating a global variable that indicates when the speculative state has been violated.

4. The method of claim 3, wherein determining, by the garbage collection system, whether to initiate the thread-local garbage collection based at least in part on the indication comprises: determining whether to initiate the thread-local garbage collection based on a current value of the global variable; wherein a recovery process is configured to update the global variable when the speculative state has been restored.

5. The method of claim 1, further comprising: adding allocation context information associated with the object allocation to a record of shared allocation sites; detecting a subsequent object allocation that has matching allocation context information stored in the record of shared allocation sites; and responsive to detecting that the subsequent allocation has matching allocation context information, performing the subsequent object allocation on a shared heap area.

6. The method of claim 5, wherein the allocation context information includes at least one bytecode index and at least one method of a caller context extracted from one or more stack frames.

7. The method of claim 5, wherein the allocation context information includes at least one program counter associated with an allocation site associated with the object allocation.

8. The method of claim 1, wherein the at least one private heap is a different private heap than the private heap associated with the thread; wherein the indication notifies the garbage collection system that the speculative state is violated across multiple threads.

9. The method of claim 1, further comprising: executing a recovery process that moves objects on the private heap that are not private to shared heap memory; and after executing the recovery process, updating the indication to restore the speculative state; and executing the thread-local garbage collection based at least in part on the indication that the speculative state is restored.

10. The method of claim 9, wherein the thread-local garbage collection reclaims memory from a terminated thread from an associated private heap.

11. One or more non-transitory computer-readable media storing instructions which, when executed by one or more hardware processors, cause:
performing an object allocation within a private heap associated with a thread;
detecting that the object allocation violates a speculative state where a garbage collection system operates as if objects in private heap are only reachable by the thread;
responsive to detecting that the object allocation violates the speculative state, generating an indication that notifies the garbage collection system that the speculative state is violated;
detecting a trigger for performing a thread-local garbage collection to reclaim memory from at least one private heap;
responsive to detecting the trigger, determining, by the garbage collection system, whether to initiate the thread-local garbage collection based at least in part on the indication.

12. The media of claim 11, detecting that the object allocation violates the speculative state comprises: detecting that a pointer to a target object in the private heap does not originate from a source object in the private heap or from a thread associated with the private heap.

13. The media of claim 11, wherein generating the indication comprises updating a global variable that indicates when the speculative state has been violated.

14. The media of claim 13, wherein determining, by the garbage collection system, whether to initiate the thread-local garbage collection based at least in part on the indication comprises: determining whether to initiate the thread-local garbage collection based on a current value of the global variable; wherein a recovery process is configured to update the global variable when the speculative state has been restored.

15. The media of claim 11, wherein the instructions further cause: adding allocation context information associated with the object allocation to a record of shared allocation sites; detecting a subsequent object allocation that has matching allocation context information stored in the record of shared allocation sites; and responsive to detecting that the subsequent allocation has matching allocation context information, performing the subsequent object allocation on a shared heap area.

16. The media of claim 15, wherein the allocation context information includes at least one bytecode index and at least one method of a caller context extracted from one or more stack frames.

17. The media of claim 15, wherein the allocation context information includes at least one program counter associated with an allocation site associated with the object allocation.

18. The media of claim 11, wherein the at least one private heap is a different private heap than the private heap associated with the thread; wherein the indication notifies the garbage collection system that the speculative state is violated across multiple threads.

19. The media of claim 11, wherein the instructions further cause: executing a recovery process that moves objects on the private heap that are not private to shared heap memory; and after executing the recovery process, updating the indication to restore the speculative state; and executing the thread-local garbage collection based at least in part on the indication that the speculative state is restored.

20. The media of claim 19, wherein the thread-local garbage collection reclaims memory from a terminated thread from an associated private heap.

* * * * *

UNITED STATES PATENT AND TRADEMARK OFFICE
CERTIFICATE OF CORRECTION

PATENT NO. : 12,197,324 B1
APPLICATION NO. : 18/363655
DATED : January 14, 2025
INVENTOR(S) : Österlund et al.

It is certified that error appears in the above-identified patent and that said Letters Patent is hereby corrected as shown below:

In the Specification

In Column 14, Line 58, delete "the p 21" and insert -- the --, therefor.

Signed and Sealed this
Eighth Day of April, 2025

Coke Morgan Stewart
*Acting Director of the United States Patent and Trademark Office*